(12) United States Patent
Salonidis et al.

(10) Patent No.: US 6,865,371 B2
(45) Date of Patent: Mar. 8, 2005

(54) METHOD AND APPARATUS FOR CONNECTING DEVICES VIA AN AD HOC WIRELESS COMMUNICATION NETWORK

(75) Inventors: Theodoros Salonidis, College Park, MD (US); Pravin Bhagwat, Scarsdale, NY (US); Richard O. LaMaire, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 09/750,999

(22) Filed: Dec. 29, 2000

(65) Prior Publication Data

US 2003/0096576 A1 May 22, 2003

(51) Int. Cl.[7] .............................. H04B 5/00; H04B 7/00; H04B 7/216; H04Q 7/20; H04L 12/43; H04J 15/00
(52) U.S. Cl. .................. 455/41.1; 455/41.2; 455/422.1; 370/441; 370/460; 370/468
(58) Field of Search ................................. 455/445, 556, 455/557, 41.1–3, 422.1, 435; 370/441–449, 460, 468

(56) References Cited

U.S. PATENT DOCUMENTS

| 6,026,297 | A | * | 2/2000 | Haartsen ................... 455/426.1 |
| 6,459,704 | B1 | * | 10/2002 | Jandrell ....................... 370/445 |
| 6,480,476 | B1 | * | 11/2002 | Willars ........................ 370/311 |
| 6,532,368 | B1 | * | 3/2003 | Hild et al. ................... 455/515 |

OTHER PUBLICATIONS

Salonidis et al, Proximity awareness and fast connection establishment in Bluetooth, Jun. 12, 2004, p. 2 and 3.*
R. Schneiderman et al., "Bluetooth's Slow Dawn," IEEE Spectrum, pp. 61–65, Nov. 2000.
M. Yamashita et al., "Leader Election Problem on Networks in which Processor Identity Numbers Are Not Distinct," IEEE Transactions on Parallel and Distributed Systems, vol. 10, No. 9, pp. 878–887, Sep. 1999.

"Baseband Specification," Bluetooth Specification Version 1.0 B, pp. 33–190, Dec. 1999.

J. Haartsen et al., "Bluetooth: Vision, Goals, and Architecture," Mobile Computing and Communications Review, vol. 2, No. 4, pp. 38–45, Oct. 1998.

* cited by examiner

Primary Examiner—Lee Nguyen
Assistant Examiner—Yuwen Pan
(74) Attorney, Agent, or Firm—Douglas W. Cameron; Ryan, Mason & Lewis, LLP

(57) ABSTRACT

A method for connecting two or more devices via a wireless communication channel is provided. In one embodiment, a method of connecting a first device to a second device includes the steps of arbitrarily assigning one of two possible states to each device, wherein in a first state, a device seeks to establish a connection with another device, and in a second state, the device renders itself available for connection with the other device; and alternating a present state of each device between the first state and the second state in accordance with a predefined probability distribution until either a predetermined timeout period has expired or a connection between the devices has been established, the length of time that each device remains in the first and second states being controlled by the probability distribution. In a second embodiment, a method of forming a scatternet between a plurality of devices or nodes in an ad hoc wireless communication network is provided.

20 Claims, 8 Drawing Sheets

METHOD AND APPARATUS FOR CONNECTING DEVICES VIA AN AD HOC WIRELESS COMMUNICATION NETWORK

FIELD OF THE INVENTION

The present invention relates generally to communication networks, and more particularly relates to a method of connecting two or more devices in an ad hoc wireless communication network.

BACKGROUND OF THE INVENTION

Bluetooth is a new technology which was developed as a short-range (about 10 meters) wireless cable replacement for linking portable consumer electronic products, such as cell phones, headsets, PDAs and laptop computers, but it can also be adapted for fax machines, printers, toys, digital cameras, household appliances and virtually any other digital consumer product or application. The technology essentially provides a mechanism for forming small wireless networks between Bluetooth-equipped devices on an ad hoc basis. It can also serve as a wireless communication bridge to existing data networks. Present Bluetooth implementation efforts generally focus on point-to-point client-server applications, such as, for example, the dialup networking profile, headset profile and local area network (LAN) access point profile (Bluetooth specification version 1.0). In these conventional implementations, Bluetooth-enabled devices will automatically seek each other out and configure themselves into networks, most often consisting of only two nodes.

Under a current specification (e.g., IEEE 802.15 Personal Area Network (PAN) developed by the PAN Working Group), up to eight Bluetooth-enabled devices can automatically configure themselves into a "piconet." Each piconet has a designated master which imposes a frequency-hopping pattern on the rest of the nodes or devices functioning as slaves. A piconet is distinguished from other similar nets in the near vicinity by its unique frequency-hopping sequence. Since each piconet employs a different frequency-hopping sequence, multiple piconets can coexist in a common area.

Piconets can also be interconnected via bridge nodes to form a larger ad hoc network known as a scatternet (multiple independent and non-synchronized piconets). Bridge nodes are generally capable of timesharing between multiple piconets, receiving data from one piconet and forwarding it to another. There is essentially no restriction on the role a bridge node may play in each piconet it participates in. For example, a bridge can function as a master in one piconet and a slave in another, or it can be a slave in all participating piconets. In this manner, several piconets can be established and linked together in ad hoc scatternets to support flexible communication among continually changing configurations.

The Bluetooth baseband specification, as set forth in J. Haartsen, "Bluetooth Baseband Specification," Version 1.0, which is incorporated herein by reference, defines the Bluetooth point-to-point connection establishment as a two step procedure. When Bluetooth units do not have any knowledge about their neighbors they must initially perform an inquiry procedure in order to discover the neighborhood information (e.g., node identities and synchronization information). Once the neighborhood information is available, a paging procedure is subsequently employed in order to establish the actual connection between the peers.

The inquiry and paging procedures comprise an asymmetric link establishment protocol which includes essentially two types of units:

Inquiring units, which try to discover and connect to neighbor units; and

Inquired units, which render themselves available to be discovered and connected with inquiring units.

The Bluetooth baseband layer supports the following fundamental states for neighborhood discovery and connection establishment:

Inquiry: The Inquiry state is used to determine the identity of Bluetooth devices within a certain operating range. The discovering unit or device collects Bluetooth device addresses and clocks of all units that respond to the inquiry message.

Inquiry Scan: In this state, the Bluetooth devices are listening for inquiries from other devices. The scanning device may listen for a general inquiry access code (GIAC) or dedicated inquiry access codes (DIAC).

Page: This state is used by an inquiring device or unit that has discovered other devices through the inquiry procedure. The inquiring unit sends page messages by transmitting the inquired unit's device access code (DAC) in different hop channels.

Page Scan: In this state, a unit listens for its own device access code (DAC) for a duration of scan window. The unit listens at a single hop frequency (derived from its page-hopping sequence) in this scan window.

Connection: As soon as this state is established, one unit is the master and the other is the slave. In this state the units can exchange packets using the channel-hopping sequence that is determined by the channel (master) access code and the master Bluetooth clock.

Standby: Standby is a default low power state in the Bluetooth unit. Only the native clock is running and there is no interaction with any other device.

There are also several intermediate states, namely, Inquiry Response, Slave Response and Master Response. These states will be described in further detail in connection with a description of the Bluetooth connection establishment protocol that follows.

FIG. 1 illustrates a logical flow diagram 100 showing a conventional point-to-point connection establishment procedure between two Bluetooth-enabled devices, namely, an Inquiring Unit 101 and an Inquired Unit 102. Both units use a universal frequency-hopping set called an inquiry hopping sequence. The steps involved in the standard connection establishment process are as follows:

1. The inquiring unit 101 first enters the INQUIRY state 120 and tries to discover which devices are within range by rapidly transmitting an Inquiry Access Code (IAC) packet 111 at a rate of 3200 hops/second, according to the universal inquiry hopping sequence, and listening for an answer between transmissions.

2. The inquired unit 102 starts in the INQUIRY SCAN state 130 and thus renders itself available to be discovered by nearby inquiring units. The inquired unit 102 starts listening on a frequency carrier for a possible inquiring unit 101 transmitting an inquiry message on this specific frequency. Every 1.28 seconds, the unit moves its listening carrier forward one hop (in frequency channel) according to the universal inquiry hopping sequence. It is evident that there is an associated frequency synchronization delay until the inquiring unit 101 and the inquired unit 102 synch to the same frequency channel.

3. Once the inquiring unit 101 and the inquired unit 102 are communicating on the same frequency, the inquired device 102 receives IAC packet 111 from the inquiring unit 101. Upon reception of the inquiry message, the inquired unit 102 goes to the STANDBY state 140 and "sleeps" for a predetermined time, R, uniformly distributed between 0 and 639 milliseconds.

4. Inquired unit 102 subsequently wakes up and begins listening again in the INQUIRY RESPONSE state 150 by starting frequency-hopping from the hop it was listening to before sleeping.

5. A second IAC packet 112 is received and the inquired unit 102 returns a frequency-hopping sequence (FHS) packet 113 to the inquiring unit 101. The FHS packet 113 contains the inquired unit's Bluetooth address and clock value, which is considered valuable synchronization information to the inquiring unit 101, that speeds up the paging process that will follow. Immediately after responding with a FHS packet 113, inquired unit 102 enters the PAGE SCAN state 160 and starts listening for its own Device Access Code (DAC) by hopping according to its own page hopping sequence.

6. On the Inquiring unit side, inquiring unit 101 receives the FHS packet 113 from the inquired unit 102 along with information that is used to determine the DAC and page hopping sequence of inquired unit 102. From this point, the paging procedure is initiated. Inquiring unit 101 enters the PAGE state 170 and starts paging by sending the DAC packet 114 according to inquired unit's 102 page hopping sequence.

7. Inquired unit 102 receives DAC packet 114, subsequently responds by transmitting DAC packet 115 and enters the SLAVE RESPONSE substate 180.

8. Inquiring unit 101 receives DAC packet 115 sent by the inquired unit 102, enters the MASTER RESPONSE substate 190 and then sends a FHS packet 116 to the inquired unit 102 containing its address and clock information.

9. Inquired unit 102 receives FHS packet 116 transmitted by the inquiring unit 101 and changes to the inquiring unit's 101 channel access code and clock, as received in the FHS packet 116. Inquired unit 102 then sends DAC packet 117 as an acknowledgment to the receipt of FHS packet 116 and subsequently enters the CONNECTION state 198 having the role of the slave in this point-to-point connection.

10. Inquiring unit 101, upon receiving DAC packet 117 from the inquired unit 102, enters CONNECTION state 199 and becomes the master of the point-to-point connection.

In accordance with the conventional Bluetooth protocol set forth above, the connection between two Bluetooth-enabled devices can be established and the devices can subsequently exchange any desired amount of information.

Although Bluetooth is a promising new technology, there exist several disadvantages inherent in the conventional connection establishment procedure or protocol. As noted above, Bluetooth supports peer-to-peer, ad hoc wireless connectivity. That is, two devices in proximity can discover each other and form a communication link therebetween. Since Bluetooth utilizes frequency-hopping spread-spectrum technology to support point-to-point and point-to-multipoint connections, devices must synchronize their frequency-hopping patterns before they can communicate with one another. This implies that hosts are not able to communicate unless they have previously "discovered" each other by synchronizing their frequency-hopping patterns. Even if all nodes are within direct communication range of each other, random synchronization delays are introduced during the formation of individual links in the network. The process of synchronization (or Inquiry in Bluetooth terminology) is a time consuming as well as asymmetric (i.e., requiring two nodes to be in different initial states) process. Consequently, when two Bluetooth devices are powered on, it may take several seconds to establish a link between the devices.

SUMMARY OF THE INVENTION

The methods and apparatus of the present invention provide a protocol for discovery and link establishment between two or more devices, preferably Bluetooth-enabled devices, that is significantly improved compared to conventional connection establishment methods. With the present invention, a multitude of Bluetooth-enabled devices may seek each other out and automatically configure themselves into more complex network structures than those supported by conventional implementations. The asynchronous distributed protocol of the present invention starts with nodes having no knowledge of their surroundings and finally results in the formation of a network that satisfies the structural connectivity constraints imposed by a Bluetooth technology or similar device connection specification.

In accordance with one embodiment of the present invention, a method of forming a symmetric connection between two or more devices via a wireless communication channel comprises choosing a predetermined probability distribution, adjusting one or more parameters associated with the probability distribution, and alternating participating device nodes between two possible states according to the predetermined probability distribution. In this manner, link or connection establishment occurs without explicit assignment of initial states to the participating device nodes.

In accordance with a second embodiment of the present invention, the novel alternating states technique is employed to form a scatternet between a plurality of devices or nodes in an ad hoc wireless communication network. During a first phase, a coordinator node is chosen by forming a point-to-point connection between two nodes and determining a winning node. Successive "one-to-one battles" are performed until a single winning coordinator node remains. The coordinator node will determine and store information pertaining to each participating device/node in the network. During a second phase, the coordinator node assigns roles to each device in the network, including which nodes will be masters, slaves, or bridges. During a third phase, the wireless network is connected in accordance with the roles assigned by the coordinator.

These and other objects, features and advantages of the present invention will become apparent from the following detailed description of illustrative embodiments thereof, which is to be read in connection with the accompanying drawings, wherein like elements are designated by identical reference numerals throughout the several views.

DETAILED DESCRIPTION OF PREFERRED EMBODIMENTS

The present invention will be described below in the context of a practical application in which two Bluetooth-enabled devices or nodes attempt to automatically establish a point-to-point communication connection between one another. It should be understood, however, that the present invention is not limited to this or any specific communication connection application. Rather, the methods and apparatus of the present invention have wide applicability for connecting virtually unlimited devices and/or nodes in an ad hoc wireless network, in accordance with the principles set forth herein.

Figure 2:
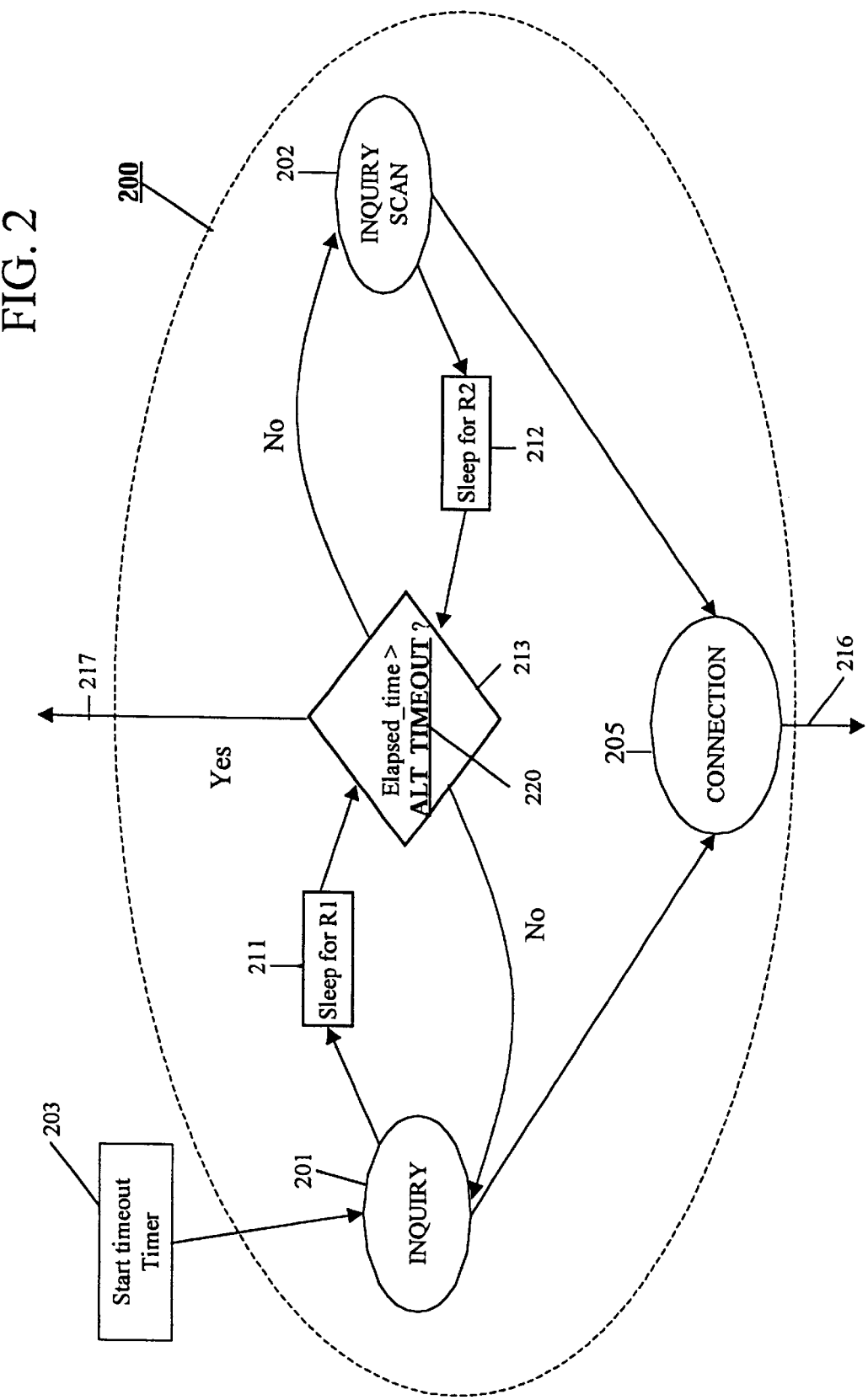
FIG. 2 is a logical flow diagram illustrating an aggregate ALTERNATE state for providing a symmetric point-to-point connection establishment protocol without role pre-assignment, formed in accordance with one embodiment of the present invention.

In accordance with one aspect of the present invention, FIG. 2 illustrates an aggregate ALTERNATE state 200 that is preferably used in order to provide a symmetric connection establishment protocol, without employing any role pre-assignment as is traditionally performed. The ALTERNATE state 200 can be implemented by one skilled in the art using, for example, program commands and/or routines defined in the specification by K. Fleming, "Bluetooth Host Controller Interface [HCI]," Version 1.0, which is incorporated herein by reference. The protocol of the present invention may similarly be implemented in hardware.

At startup, which may be initiated, for example, by an end user simply activating a "start" button and waiting for connection to be automatically established, each Bluetooth unit preferably initializes a start timeout timer 203 and subsequently enters a first state 201. The start timeout timer 203 preferably keeps track of elapsed time and may be implemented, for example, as a standard counter, as known by those skilled in the art. It is important to appreciate that state 201 can be arbitrarily chosen to be either an INQUIRY or an INQUIRY SCAN state. Furthermore, it is to be appreciated that the INQUIRY and INQUIRY SCAN states are preferably substantially transparent to the end user and not predetermined, as in the conventional connection establishment method. With reference to the example of FIG. 2, state 201 is chosen to be the INQUIRY state.

The Bluetooth unit preferably remains in the INQUIRY state 201 for a period of time, R1, functioning essentially in a "sleep" or standby mode 211 wherein substantially no device interaction takes place. Preferably, a predefined probability distribution chosen by the user is employed to control the period of time a unit remains in either the INQUIRY or INQUIRY SCAN state. This distribution may be chosen, for example, to be a random distribution. By modifying one or more parameters associated with the distribution, the user can affect the alternating state sequence, thereby optimizing the device connection establishment time as desired.

After the unit has remained in its state 201 for the time period R1, the elapsed time is preferably measured 213 to determine whether a predefined fixed time interval ALT_TIMEOUT 220 has been exceeded. If the interval ALT_TIMEOUT has been exceeded, the Bluetooth unit preferably exits 217 the ALTERNATE state 200. Upon exiting 217 the ALTERNATE state 200, the unit may issue a timeout notification, such as by setting a flag or similar indication means, preferably indicating that no connection was established within the predefined timeout period. If the time period ALT_TIMEOUT 220 has not been exceeded, the unit advances to a second state 202, which is preferably the remaining one of the two initial states (INQUIRY or INQUIRY SCAN) that was arbitrarily chosen as the first state 201. In the example of FIG. 2, the second state 202 is an INQUIRY SCAN state, since the first state 201 was arbitrarily chosen to be an INQUIRY state. The unit then remains in state 202 for a second period of time, R2, essentially in a "sleep" mode 212. As for the first time period R1, a predefined probability distribution is preferably chosen to control the length of time R2 the unit remains in its present state 202. It is to be appreciated that the distribution used to determine the period of time R2 may be different from the distribution used for the time period R1. Once again, the timeout expiration check 213 is preferably subsequently performed in accordance with the present invention, as described above.

Assuming that there is no other Bluetooth unit within operating proximity to establish a connection, the state switching procedure 200 (i.e., alternately switching between INQUIRY and INQUIRY SCAN states) will preferably halt once the predefined fixed timeout period ALT_TIMEOUT 220 has been exceeded. If there is another Bluetooth-enabled unit within operating range, the two units will preferably begin by utilizing the ALTERNATE state protocol 200 and, depending upon whether the particular unit is in the INQUIRY state 201 or the INQUIRY SCAN state 202, each unit will subsequently enter the CONNECTION state 205 and will function as either a master or a slave unit, respectively. It is to be understood that in order for a valid connection to be established between two Bluetooth units, the units must be in complimentary states (e.g., INQUIRY/INQUIRY SCAN). Once the CONNECTION state 205 has been entered, the ALTERNATE state 200 is preferably exited 216.

Figure 3:
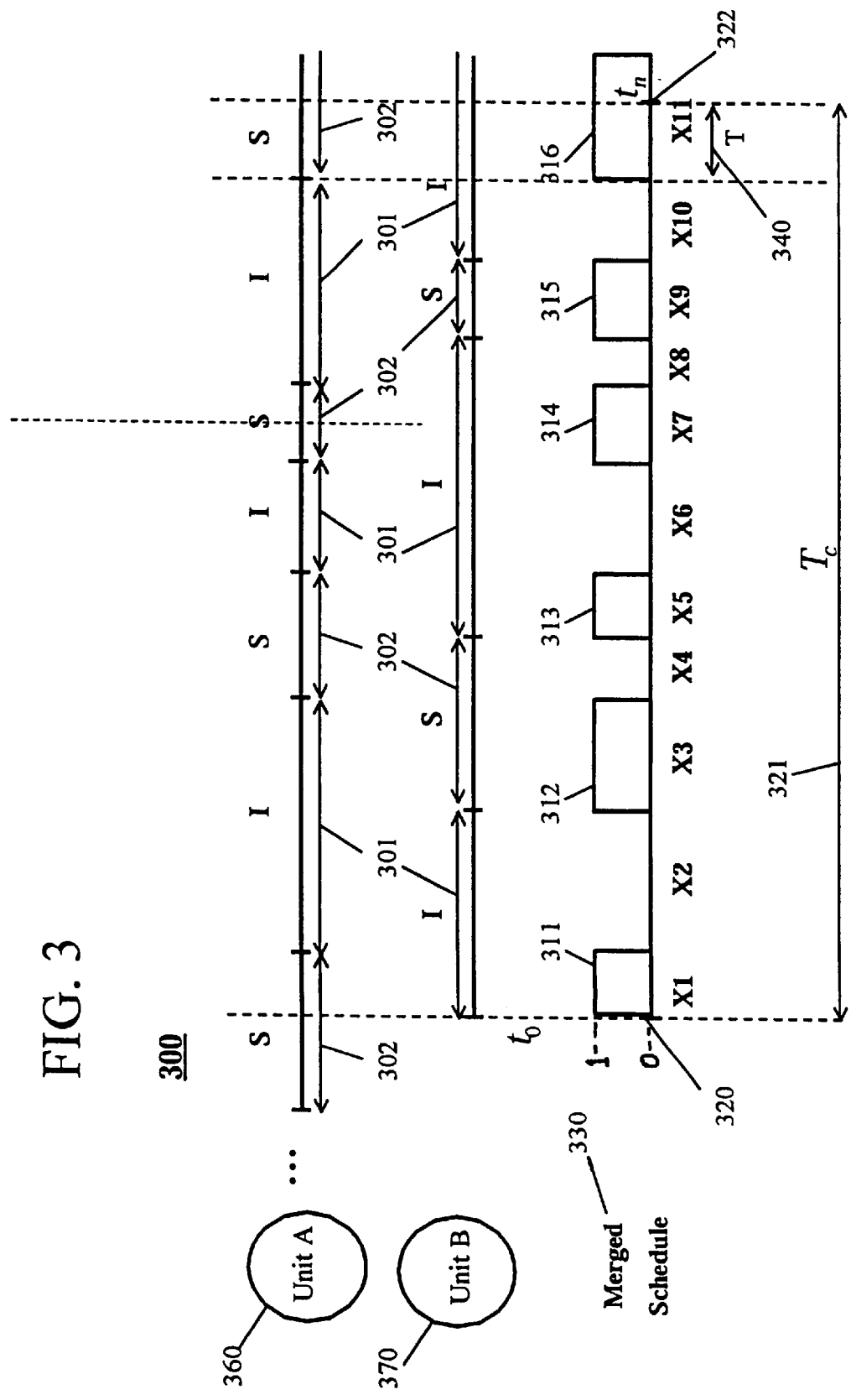
FIG. 3 is a logical timing diagram depicting the symmetric point-to-point connection establishment protocol shown in FIG. 2.

By way of example only, consider a scenario involving two Bluetooth-enabled devices, namely, "Unit A" 360 and "Unit B" 370 (see FIG. 3), each unit employing the ALTERNATE state procedure 200 (see FIG. 2) of the present invention when trying to establish a connection with each other. FIG. 3 depicts a logical timing diagram 300 indicating an illustrative state switching sequence performed by each unit 360, 370 while executing the ALTERNATE state procedure of the present invention. With reference to FIG. 3, the state switching activity for the two Bluetooth units 360, 370 is shown, along with a Merged Schedule 330, superimposed on a common time axis for ease of explanation. The intervals labeled "I" 301 correspond to a unit being in an INQUIRY state and the intervals labeled "S" 302 correspond to a unit being in an INQUIRY SCAN state. The INQUIRY and INQUIRY SCAN states were previously described in connection with the ALTERNATE state procedure shown in FIG. 2.

The example of FIG. 3 presupposes that Unit A 360 has already initiated the ALTERNATE state protocol, seeking to establish a communication link with another Bluetooth device, for an undetermined period of time prior to an arbitrary initial point in time, $t_0$, 320 and is thus alternating between the two states INQUIRY and INQUIRY SCAN. Time to 320 is preferably arbitrarily chosen to be the starting point for Unit B 370, wherein Unit B similarly begins alternating between the INQUIRY and INQUIRY SCAN states according to the ALTERNATE state procedure defined by the present invention.

The merged schedule 330 preferably displays a combined state switching sequence for the two units 360, 370 characterized by a plurality of "on-off" intervals $X_1$. Preferably, an interval $X_1$ is defined as the period of time between state changes of one or both Bluetooth units 360, 370. The time duration of any interval $X_i$ will be random since the amount of time a unit remains in any particular state (e.g., INQUIRY or INQUIRY SCAN) is random, as discussed herein above. Consequently, the intervals $X_i$ will generally not be evenly spaced with respect to each other, although there is a statistical possibility that the intervals $X_i$ can be evenly spaced.

In accordance with a preferred embodiment of the present invention, the two units 360, 370 have an opportunity to locate or "discover" each other only during time intervals where they are in complimentary states (e.g., unit 360 is in state 301 while unit 370 is in state 302). In essence, this amounts to an exclusive-OR function, whereby the merged schedule 330 displays a logic "1" ("on") output whenever the two units 360, 370 are not in the same state. These "on" intervals are labeled 311, 312, 313, 314, 315 and 316, corresponding to intervals X1, X3, X5, X7, X9 and X11, respectively.

Figure 1:
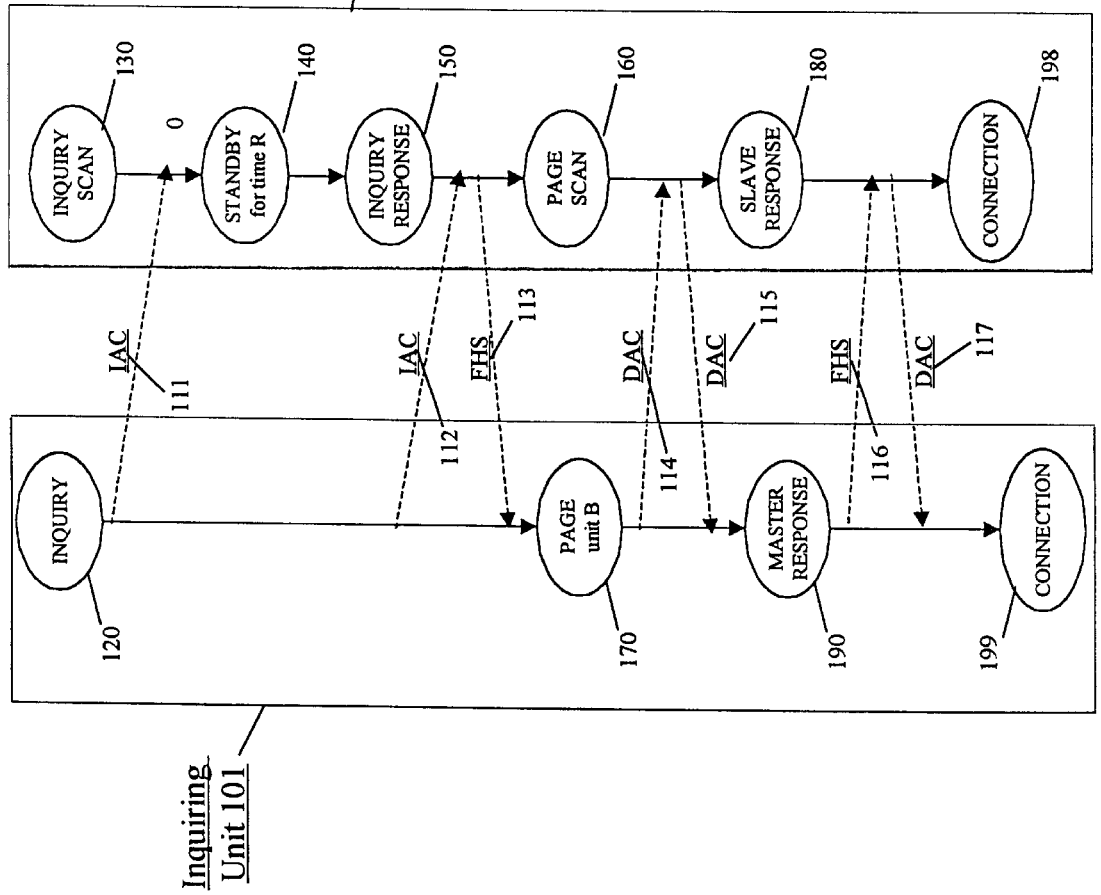
FIG. 1 is a logical flow diagram illustrating a conventional asymmetric connection establishment protocol between two Bluetooth-enabled devices.

With continued reference to FIG. 3, at the start of a first "on" interval X1 (311), the units 360, 370 preferably initiate a connection establishment procedure in a conventional manner, for example using the steps previously described in connection with FIG. 1. The connection establishment process will generally take a random finite amount of time, T, 340 that includes frequency synchronization delays and the inquired unit's standby or backoff delay 140 (see FIG. 1). If the amount of time T 340 to complete the connection process is less than the duration of the "on" interval (e.g., 316) then, after executing the connection procedure of FIG. 1, the two units 360, 370 preferably enter the CONNECTION state 205 of FIG. 2. After entering the CONNECTION state 205, both units preferably exit 216 the ALTERNATE state procedure 200 with an output notification, or suitable equivalent thereof, acknowledging that a valid connection has been established (see FIG. 2). However, if either of the units change state (e.g., INQUIRY 301 to INQUIRY SCAN 302) prior to completing the connection procedure depicted in FIG. 1 (e.g., the completion time period T 340 is greater than the respective "on" interval"), then no valid connection is established and the units 360, 370 must wait until a next subsequent "on" interval (e.g., interval X3 312) until a connection procedure is again attempted. If the units fail to connect during the next valid time interval 313, connection is successively attempted during subsequent "on" intervals 313, 314, and so on, until a connection is eventually established or until a predetermined connection timeout period has expired. A connection establishment time, $T_c$, 321 is preferably defined as the duration of time beginning at the initial time, $t_0$, 320 and ending at a point in time, $t_n$, 322 in which the two Bluetooth units 360, 370 are in complementary states for a sufficient amount of time necessary to establish a connection while using the ALTERNATE state procedure of the present invention.

The novel "alternating states" technique of the present invention described in FIGS. 2 and 3 is a mechanism that guarantees an ad hoc point-to-point connection between two Bluetooth devices. When there are more than two devices and they wish to form a scatternet "on the fly," the present invention, in accordance with a second embodiment, provides a unique protocol, incorporating the "alternating states" mechanism described herein above, to ensure that the resulting network fulfills the requirements and architecture of a Bluetooth scatternet.

Consider an example application in which there are several users in a room that wish to form an ad hoc network using their Bluetooth-enabled devices (or similarly, a single user with multiple Bluetooth-enabled devices). Each user preferably initiates a connection procedure by pressing a "start" button, or invokes a similar process, and subsequently waits for the device to acknowledge that the connection has been established, for example, by displaying a "network connection established" message after a short period of time. After such acknowledgment, the user will be able to exchange information with another user or device in the room. It is assumed, for this example, that all participating devices are within operating range of each other, which is a logical assumption for networking many wireless devices in a single room.

The above scenario actually includes the elements of a successful connection establishment protocol, namely:

Network connection establishment should be performed in a substantially distributed fashion. This means that each device preferably starts operating asynchronously on its own and it initially does not have any knowledge about the identities or number of nodes in the room.

After successful connection completion, the protocol should guarantee a connected scatternet. There should be at least one path between any two nodes in the network (correctness).

The network should connect in a reasonable amount of time that is tolerable by the end user (efficiency).

In accordance with a preferred embodiment of the present invention, there are essentially no restrictions regarding the final form of the Bluetooth scatternet. The only requirements or guidelines are that:

1. There should be piconets that have one master and less than seven slaves (some of which may be bridges).
2. Piconets should be interconnected through bridge nodes.
3. Every node must be able to reach every other node in the resulting network (i.e., the network must be fully connected).

Given the above freedoms and in order to design a faster protocol, the present invention, in a preferred embodiment, imposes the following structural constraints:

A bridge node may connect only two piconets. (Bridge Degree Constraint) A bridge has to divide its work into many parts in a time division manner. Given that each portable device may have limited processing capabilities, imposing a maximum bridge degree of two (2) relieves a node of being a crossroad for multiple originated data transfers.

Two piconets share only one bridge (Piconet Overlap Constraint) This condition is preferably imposed in order to provide a means of more quickly terminating the connection establishment protocol. If two masters later wish to share another bridge between them, they can do so, for example, by a conventional bridge negotiation protocol.

In accordance with a preferred embodiment of the present invention, a protocol or mechanism for connecting Bluetooth devices in a scatternet is provided. The protocol is preferably based, at least in part, on a leader election algorithm or process. As understood by those skilled in the art, leader election addresses the problem of choosing a unique leader node in the sense that the elected leader knows that it has been elected and the other nodes know that they have not been elected. The concept of leader election is an important tool which may be used for breaking symmetry in a distributed system. Since the nodes start asynchronously and without any knowledge of the total number of participating nodes, a leader will be able to control the network establishment.

The network establishment procedure of the present invention preferably comprises three distinct phases, namely, a Coordinator Election phase (Phase I), a Role Determination phase (Phase II) and a Connection Establishment phase (Phase III). Each of these phases will be described in detail herein below.

Phase I: Coordinator Election

During the coordinator election phase, there is preferably an asynchronous, distributed election of a coordinator node that will eventually determine and store the number, address and clock information of each participating node in the network construction. The coordinator node will be responsible for determining which participating nodes are the master(s), slaves and bridges (which are preferably slaves serving two or more masters) of the network.

Several variables and associated functions are preferably defined for use with the present invention. During phase I, each unit or node x preferably has the following variables at its disposal:

MY_VOTES: This variable is used to determine the number of VOTES a particular node has received so far.

OTHER_VOTES: During a point-to-point connection, this variable is defined as the MY_VOTES value of the other peer node.

MY_ID: This variable retains the Bluetooth Address of unit x.

OTHER_ID: During a point-to-point connection, this variable is defined as the MY_ID variable of the other peer node.

MY_FHS_LIST: This variable, which may be implemented as an array, holds the current list of file hierarchy system (FHS) packets of the node(s) that unit x has seen so far, including its own. This list, for example, may include entries of the following type:

```
typedef struct FHSListInfo_type
{
unsigned int address;
unsigned int clock;
}FHSInfo;
```

OTHER_FHS_LIST: During a point-to-point connection, this variable, which may be implemented as an array, is defined as the MY_FHS_LIST of the other peer node. This list also contains elements of type FHSInfo as defined above.

Figure 4:
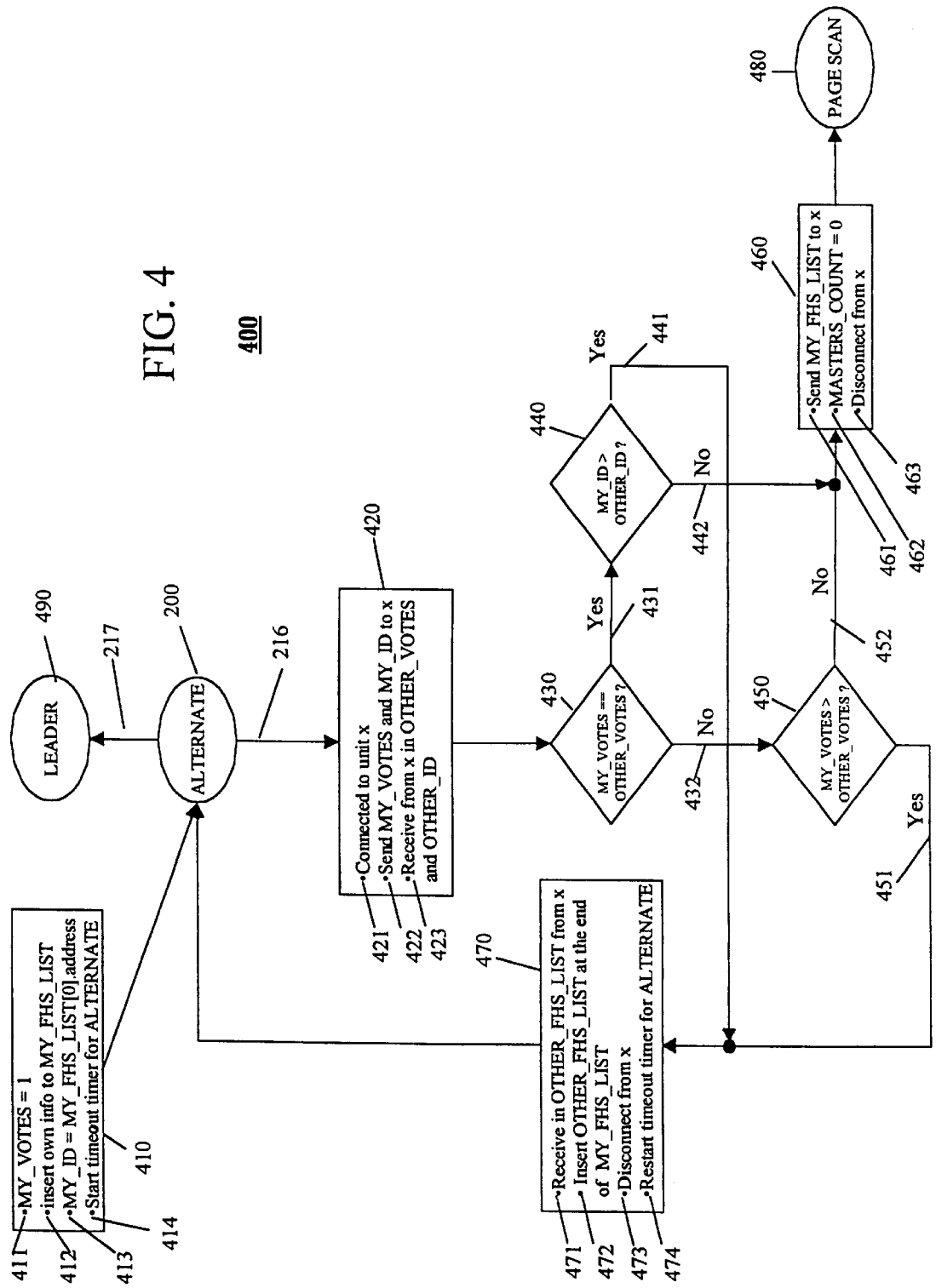
FIG. 4 is a logical flow diagram illustrating actions and state transactions taken by each node during an election process (Phase I) of the network formation protocol, in accordance with one embodiment of the present invention.

FIG. 4 is a logical flow diagram 400 which depicts the actions and state transitions that take place by each node during a phase I illustrative example, in accordance with the present invention. With reference to FIG. 4, each node preferably starts in an INITIALIZE state 410 by setting a variable MY_VOTES=1 (411). In the INITIALIZE state 410, an FHSInfo entry is preferably added to an array MY_FHS_LIST 412 which includes a Bluetooth Address and clock information for the particular node. List entry M_FHS_LIST[0] preferably includes node x Bluetooth address and clock information. Moreover, node x preferably sets the MY_ID local variable equal to M_FHS_LIST[0].address 413. Prior to exiting the INITIALIZE state 410, the start timeout timer (203 in FIG. 2) employed in the ALTERNATE procedure is preferably started and the unit then enters the aggregated ALTERNATE state 200, described previously in connection with FIG. 2.

With continued reference to FIG. 4, any two nodes x and y that discover each other will preferably form a point-to-point connection and will both exit the ALTERNATE state 200 through the output or exit point 216. Upon forming a connection, the two nodes x and y preferably enter a "one-to-one battle" to determine which of the two nodes is deemed the "winner." For example, the battle may comprise an exchange 420 of information relating to the variables MY_VOTES and MY_ID between the two nodes x and y, 422 and 423. Each unit subsequently compares 430 its MY_VOTES variable with its OTHER_VOTES variable (which, again, is equated to the MY_VOTES variable of the other unit). If the two variables are equal 431 then another comparison 440 is preferably performed with respect to the MY_ID variables of the two nodes, and the node with the larger ID wins the battle. If, alternatively, the two variables MY_VOTES and OTHER_VOTES are not equal 432, then a subsequent comparison 450 is preferably performed and the unit with a larger number of votes 451 wins the battle.

Assume that unit x in the example of FIG. 4 is determined to be the winning unit. The losing unit y (442 or 452) preferably performs certain intermediate tasks 460 before entering a PAGE SCAN state 480. The intermediate tasks 460 include sending 461 its MY_FHS_LIST to the winning unit x, setting a MASTERS_COUNT variable equal to zero 462 and disconnecting from unit x 463. After entering the PAGE SCAN state 480, the losing unit y will not be able to respond to inquiry messages but will only respond to page messages from nodes that will know about it and page it in the future. Essentially, this has the effect of putting this node out of competition from the coordinator election process and preparing it for phase II of the novel Bluetooth network formation protocol of the present invention.

The winning unit x (441 or 451) preferably performs certain tasks 470 which may include receiving the losing unit's MY_FHS_LIST in local variable OTHER_FHS_LIST 471 and then appending this list to its current MY_FHS_LIST 472. The winning unit x also preferably increases its current MY_VOTES value by an amount equal to the value of OTHER_VOTES before finally terminating the connection with the losing unit y 473 and restarting the start timeout timer 474. The winning unit x then preferably enters the ALTERNATE state 200 to repeat the process 400 again until all participating nodes in the network are eventually known. Therefore, at the end of phase I there will be only one unit in the ALTERNATE state 200 and it will exit this state through output point 217 when the timeout ALT_TIMEOUT has been exceeded (indicating that there are no more nodes to be discovered). At this point, the remaining unit will assume that it is the elected coordinator and will consequently start phase II by entering the LEADER state 490. It is to be appreciated that the timeout interval ALT_TIMEOUT (220 in FIG. 2) should be selected so as to guarantee that only one node will eventually be elected as a coordinator.

Phase II: Role Determination

At the end of phase I, the winner of the whole competition is the coordinator and the rest of the nodes preferably reside in a PAGE SCAN state 480 waiting to be paged. The coordinator node and the nodes in the PAGE SCAN state 480 will generally perform different actions.

Several variables and associated functions are preferably defined for use with the present invention. The variables used in phase II by the Coordinator node preferably include:

N: This variable represents the number of nodes seen in phase I.

P: This variable represents the number of masters that the resulting scatternet will comprise.

BRIDGELIST(i) and SLAVELIST(i): For each master i of the resulting piconet, the pair of lists BRIDGELIST(i) and SLAVELIST(i), which may be implemented as arrays of depth i, will preferably store the identities of the bridge nodes and slaves nodes, respectively, assigned to master node i.

MASTERS: This variable is a list of size P, which preferably stores entries of type FHSInfo and includes the masters that have been chosen by the coordinator.

HeadPacket: This is a data packet that is preferably always sent from a master node to a slave node at the start of each connection establishment procedure. In the preferred embodiment, this packet directs the slave node to behave as specified by two bits, namely:

HeadPacket.Mbit—If this bit equals "1," it specifies that the node receiving the HeadPacket is assigned by the coordinator to be a master node in the resulting scatternet; and HeadPacket.Bbit—If this bit equals "1," it specifies that the node receiving the HeadPacket has been assigned by the coordinator to be a bridge node in the resulting scatternet.

Figure 5:
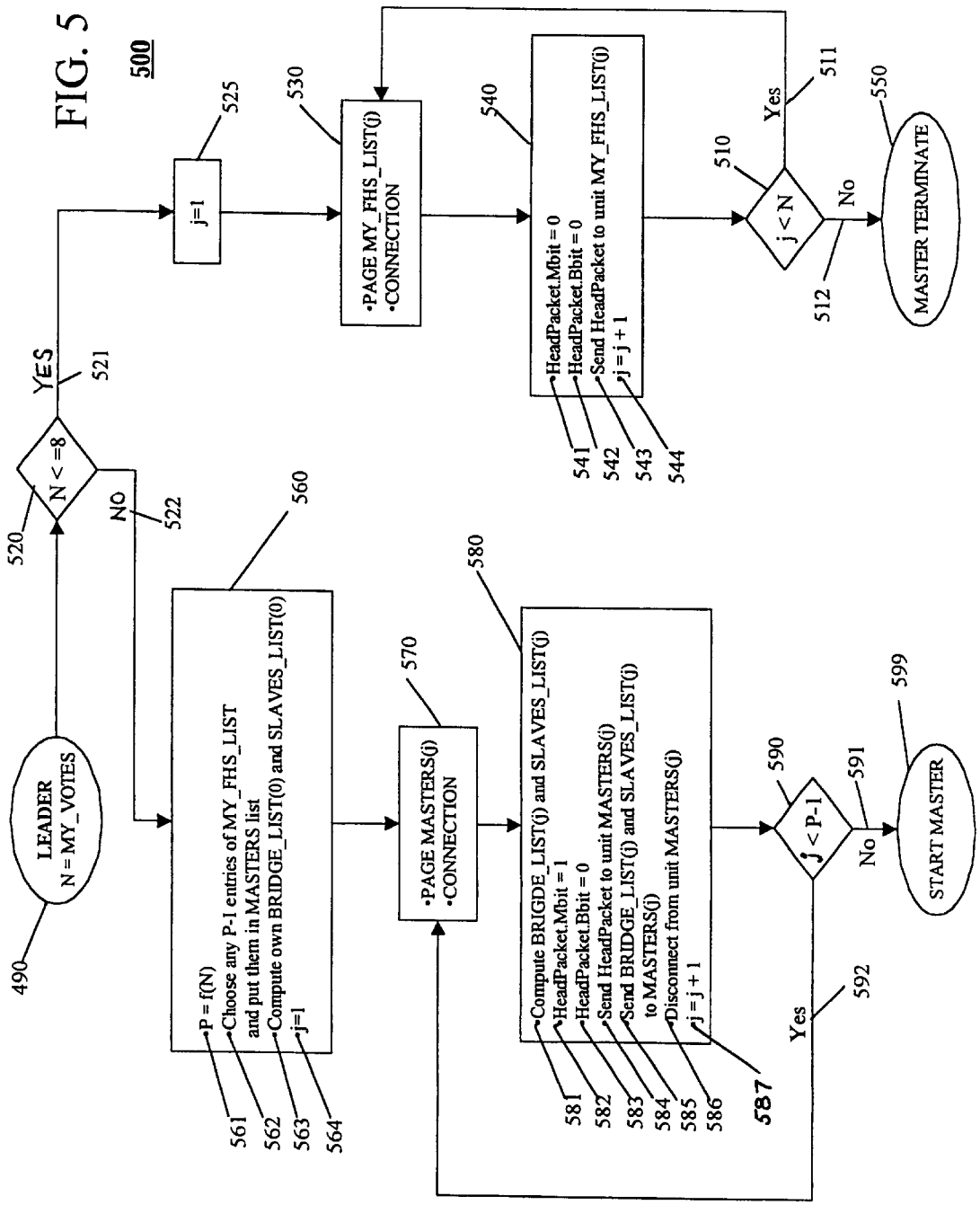
FIG. 5 is a logical flow diagram illustrating actions taken by a coordinator node during a role assignment phase (Phase II) of the network formation protocol, in accordance with one embodiment of the present invention.
Figure 6:
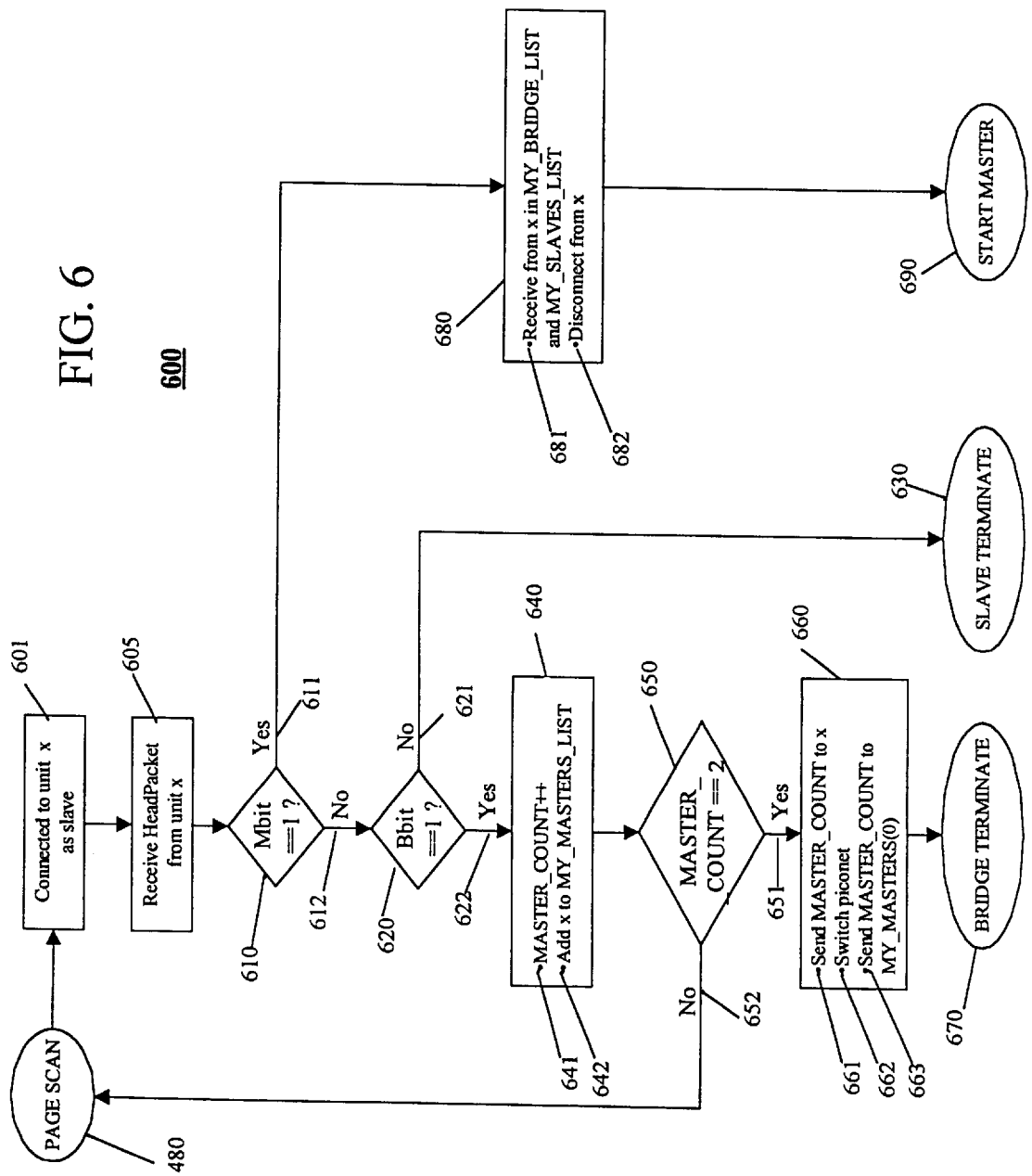
FIG. 6 is a logical flow diagram illustrating actions taken by a slave node during the role assignment phase (Phase II) and a connection establishment phase (Phase III) of the network formation protocol, in accordance with one embodiment of the present invention.

FIG. 5 is a logical flow diagram 500 which depicts the actions taken by a coordinator node during phase II of the Bluetooth network establishment protocol of the present invention. Moreover, FIG. 6 is a logical flow diagram 600 illustrating the actions taken by a node that has entered the PAGE SCAN state 480 at the end of phase I. FIG. 6 will be cross referenced when phase II and phase III are described herein below.

Referring now to FIG. 5, the master or leader preferably initially assigns the number of nodes N to be equal to the variable MY_VOTES 490. The coordinator then determines if the value of N is less than eight (8) 520. If this is true 521, only a single piconet is required with the coordinator acting as the master, thus eliminating the need for bridge nodes to other piconets.

In the case of a single piconet (i.e., if N is less than or equal to eight), the coordinator preferably pages and connects 530 to all of the N nodes that are in PAGE SCAN before finally terminating 550 the phase II procedure. During an iteration interval j, which is initially set equal to one (1) 525, the coordinator preferably pages and connects to a slave unit corresponding to the address MY_FHS_LIST(j).address 530, sets both the Mbit and Bbit bits of the data packet HeadPacket equal to zero (0), 541 and 542, respectively, and sends this packet as the first data packet to the slave 543. An iteration pointer is then increased by one 544 and measured to determine if the next iteration interval j is less than the number of nodes N 510. The page/connection and packet initialization steps 530, 540 are preferably repeated as long as the iteration interval j remains less than N 511. Once the iteration interval j is equal to or exceeds the number of nodes N 512 (i.e., all units in the list MY_FHS_LIST have been accessed by the coordinator), the coordinator enters the MASTER TERMINATE state 550 thereby terminating the phase II connection establishment protocol 500. The coordinator thereafter operates in the CONNECTION state as a master. Thus in accordance with the above procedure of the present invention, a piconet can be formed with the coordinator functioning as the master and all the other nodes functioning as slaves.

With continued reference to FIG. 5, where the number of nodes N is greater than eight 522, since the coordinator has a global view of the network it can decide on the role that each node will have in the final scatternet. The role decision is closely tied to the criteria for forming a Bluetooth scatternet. For example, different applications may allow the same node to act as a master or a slave. It may also be possible for a node to have more restrictive degree constraints due to its own nature. For instance, a Palm Pilot would most likely not have the requisite processing power to be a master of a seven-slave piconet, unless, of course, the remaining nodes in the piconet have less processing capability than the Palm Pilot. These constraints can be communicated to the leader or coordinator during the election process, and can aid the coordinator in determining the roles of the participating nodes in the final scatternet. In the absence of additional (or any) constraints, a default role selection technique may be implemented:

Given the number of participating nodes N, the resulting scatternet should comprise the minimum number of piconets (and hence masters) as possible.

The resulting scatternet should be fully connected. This means that every master should be connected to all other masters, preferably via bridge nodes.

It is to be appreciated that the above default role selection criteria is merely illustrative and may be easily modified in accordance with the present invention.

A minimum number of master nodes or piconets, P, in order for the resulting Bluetooth scatternet to be fully connected can be calculated 561 using the following relation:

$$P = f(N) = \left\lceil \frac{17 - \sqrt{289 - 8N}}{2} \right\rceil, 1 \leq N \leq 36$$

As observed from the above relation, the default technique works for a number of nodes N greater than or equal to zero and less than or equal to 36 due to the full connectivity and minimum number of piconets requirement. A larger number of nodes may lead to a default approach that does not result in full scatternet connectivity.

Referring to FIG. 5, the phase II protocol of the present invention preferably determines which nodes are to be masters, bridge nodes and slave nodes 560. After calculating P 561, the coordinator selects P-1 nodes (not including itself) to be the master nodes 562 (which are preferably stored in the variable MASTERS) and $$\frac{P(P-1)}{2}$$

other nodes to be the bridge nodes of the network. The coordinator preferably equally distributes, to the masters, the remaining nodes to be their "pure" slaves in block 580. After deciding on the masters, bridges and slaves, the coordinator preferably creates and assigns to itself BRIDGE_LIST(0)

and SLAVES_LIST(0) 563, since it will operate as a master in phase III of the present protocol. An iteration interval pointer or counter j is then preferably initiated by setting j equal to one (1) in step 564.

During each iteration j, the coordinator subsequently pages and connects to a unit represented by an address MASTERS(j).address 570. Recall that at the end of phase I, all the remaining nodes were in the PAGE SCAN state 480 (see FIG. 4). During iteration j, the coordinator further preferably computes BRIDGE_LIST(j) and SLAVES_LIST(j) 581 and sets the Mbit and Bbit bits of the data packet HeadPacket to 1 and 0, respectively, 582 and 583. This packet is then transmitted to the unit MASTERS(j).address 584 as the first data packet. The lists BRIDGE_LIST(j) and SLAVES_LIST(j) are also preferably sent 585 to the unit MASTERS(j).address before disconnecting itself from the unit 586.

After disconnecting itself from the unit MASTERS(j).address, the coordinator preferably increases the iteration pointer j by one 587 and then checks 590 to determine whether the iteration count has been exceeded (e.g., j is greater than or equal to P−1). If the count has been exceeded 591, indicating that all units in the MASTERS list have been accessed, the coordinator preferably enters phase III in a START MASTER state 599. If the iteration count j has not been exceeded 592, the page/connection process 570 and corresponding packet and list transmission 580 is performed for the next iteration interval (i.e., j+1) until such condition (j<P−1) is no longer true.

Referring now to FIG. 6, during iteration j, unit x corresponding to address MY_FHS_LIST(j).address is preferably paged 480 and connected 601 to the coordinator as a slave. After connection has been established, the coordinator will preferably receive the HeadPacket 605 from unit x which originated from transmission 543 of the coordinator (see FIG. 5). The packet HeadPacket from the unit MY_FHS_LIST(j).address will then be checked to determine the value of the Mbit bit 610. Since this bit was set equal to zero (0) in initialization step 541 (see FIG. 5), the control path 612 will then preferably cause the coordinator to check the value of the Bbit bit 620. Again, since the Bbit was set to zero (0) during initialization step 542 (see FIG. 5), the control path 621 will preferably cause unit x to enter the SLAVE TERMINATE state 630, wherein the unit has terminated execution of the connection establishment protocol and is currently in the CONNECTION state operating as a slave.

On the master unit side, during iteration j the unit x corresponding to address MASTERS(j).address will also preferably be paged 480 and connected 601 to the coordinator as a slave. After connection has been established, the coordinator will preferably receive the HeadPacket 605, which originated from the transmission step 584 of the coordinator (see FIG. 5), from unit x. The packet HeadPacket from unit x (i.e., MASTERS(j).address) will then be checked to determine the value of the Mbit bit 610. Since this bit was set equal to one (1) in an initialization step 582 (see FIG. 5), the control path 611 will then preferably cause the coordinator to receive the local list variables MY_BRIDGE_LIST and MY_SLAVES_LIST 681 from unit x, which was transmitted by the coordinator during step 584 (see FIG. 5). Upon the connection termination 682 initiated by the coordinator, unit x preferably enters phase III in a START MASTER state 690.

Phase III: Actual Connection Establishment

During phase III, the P master nodes preferably begin paging and connecting to the slave and bridge nodes that were assigned to them by the coordinator node during the role assignment phase (phase II). As shown in the example logical flow diagram 700 of FIG. 7, the operation of a master node starts in the START MASTER state 702, which is the same as 599 or 690 (see FIGS. 5 and 6). In accordance with the preferred embodiment of the present invention, the master unit first preferably connects to its pure slave units, then the master unit preferably connects to its bridge units. An example connection protocol is described in further detail herein below.

Figure 7:
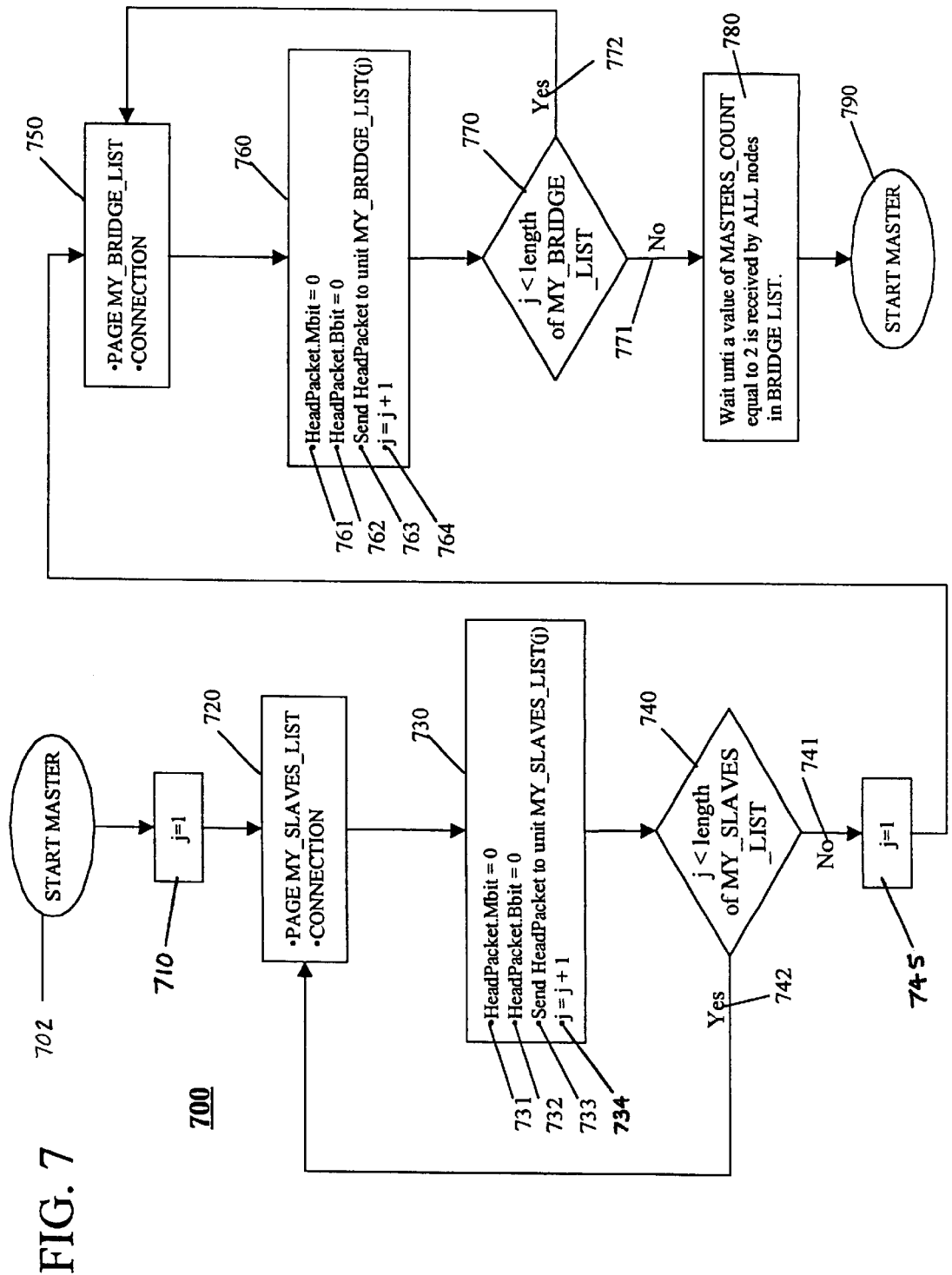
FIG. 7 is a logical flow diagram illustrating actions taken by a designated master node during the connection establishment phase (Phase III) of the network formation protocol, in accordance with one embodiment of the present invention.

With reference to FIG. 7, during an iteration step j, which may initially be set equal to one (1) 710, the master unit preferably pages and connects to a unit represented by the address MY_SLAVES_LIST(j).address 720. After connection has been established, the master preferably sets both the Mbit bit of the data packet HeadPacket equal to zero 731 and the Bbit bit of the data packet HeadPacket equal to zero 732, and sends this packet as the first data packet to the unit MY_SLAVES_LIST(j).address 733. After transmitting the data packet, the iteration pointer j is preferably incremented by one (1) 734 and checked 740 to determine whether its value is less than the length of the MY_SLAVES_LIST list. As long as the iteration count remains less than the length of the list MY_SLAVES_LIST, the paging/connection 720 and packet initialization/transmission 730 procedures preferably repeat 742 for the next subsequent iteration.

During each iteration j, the unit MY_SLAVES_LIST(j).address will be paged 480 and connected 601 to the coordinator and will receive the HeadPacket 605 from transmission 733 of the coordinator, as similarly discussed above in connection with FIG. 6. Unit MY_SLAVES_LIST(j).address will then follow the control path 610, 620, 621 (since both Mbit and Bbit were previously set equal to zero) and will enter the SLAVE TERMINATE state 630, indicating that the unit has terminated execution of the connection establishment protocol and is currently in the CONNECTION state operating as a slave.

Once the iteration count j is equal to or has exceeded the length of the MY_SLAVES_LIST list 741, implying that the master has connected to all participating slave nodes, the master preferably starts connecting to its bridge nodes in a similar manner. Specifically, during iteration j, which is again initially set to one (1) 745, the master unit preferably pages and connects to the unit corresponding to the address MY_BRIDGES_LIST(j).address 750, sets the Mbit and Bbit bits of the data packet HeadPacket to 0 and 1, respectively 761, 762 and sends this packet as the first data packet to the unit MY_BRIDGES_LIST(j).address 763. The iteration pointer j is then preferably incremented by one (1) 764 and checked 770 to determine if the iteration count has exceeded a length of the MY_BRIDGES_LIST list. The page/connection 750 and packet initialization/transmission 760 procedures are preferably repeated 772 until the iteration count j is equal to or has exceeded the length of the MY_BRIDGES_LIST list 771, indicating that the master has connected to all participating bridge nodes.

When master unit has connected to all the units in its MY_BRIDGES_LIST 771, the master preferably waits until all units in the list send a MASTER_COUNT value equal to two (2) 780. Once this condition occurs, the coordinator preferably enters a MASTER TERMINATE state 790, wherein the unit has terminated execution of the connection establishment protocol and is currently in the CONNECTION state operating as a master.

Referring again to FIG. 6, during each iteration j, the unit MY_BRIDGES_LIST(j).address will be paged 480 and connected 601 and will receive the HeadPacket 605 from the transmission 763 of the coordinator FIG. 7. The unit MY_BRIDGES_LIST(j).address will preferably follow the control path 610, 612, 620, 622, since the Mbit bit is set equal to zero (0) 761 and the Bbit bit is set equal to one (1) 762 in the packet HeadPacket (see FIG. 7). The value of the variable MASTERS_COUNT, which is initially set equal to zero (462 in FIG. 4), is preferably incremented by one (1) 641 and the master unit will be added to the coordinator's MY_MASTERS_LIST 640. If, by checking the variable MASTER_COUNT 650, the unit is determined to be the first master that connects to the slave unit 652, then the PAGE SCAN state 480 is entered again in order to be connected to a second master. Alternatively, if the unit is the second master (e.g., MASTER_COUNT=2) 651 to which the slave unit has been connected, the unit MY_BRIDGES_LIST(j).address preferably sends the variable MASTERS_COUNT, which should presently be equal to two (2), to both masters that are in its MY_MASTERS list 660. This may be accomplished by first sending the variable MASTERS_COUNT to unit x 661, switching the piconet 662, and then sending the variable MASTERS_COUNT to the unit MY_MASTERS(0) 663. Finally the unit MY_BRIDGES LIST(j).address will enter a BRIDGE TERMINATE state 670, wherein the unit has terminated execution of the connection establishment protocol and is currently in the CONNECTION state operating as a bridge node.

Protocol Termination: When all masters receive a MASTER_COUNTER=2 message from all their assigned bridges, a fully connected scatternet of P piconets is essentially guaranteed to have formed, and the protocol of the present invention, as described herein, may then terminate. At that time, each node is preferably operating in the CONNECTION state either as a master, slave or bridge.

Figure 8:
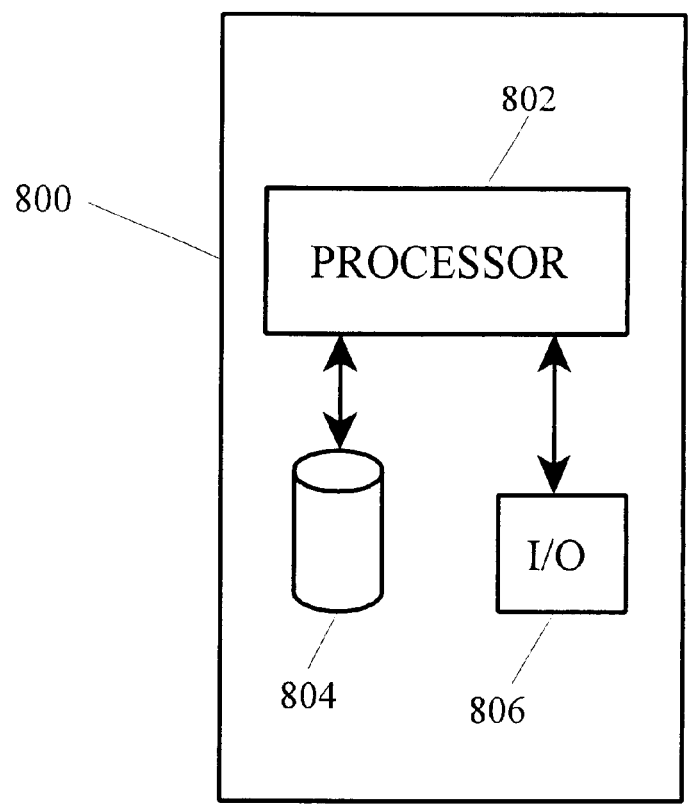
FIG. 8 is a block diagram illustrating a typical Bluetooth-enabled device including a processor and related components.

Referring now to FIG. 8, a block diagram is shown illustrating a generalized hardware architecture of a typical Bluetooth-enabled device 800 for implementing the various functional components/modules of the wireless device connection protocol depicted in the figures and described herein. As shown, the device 800 may be implemented in accordance with a processor 802, a memory 804 and input/output (I/O) devices 806. It is to be appreciated that the term "processor" as used herein is intended to include any processing device (e.g., digital signal processor, microcontroller, etc.), for example, one that includes a central processing unit (CPU) and/or processing circuitry. The term "memory" as used herein is intended to include memory associated with a processor or CPU, such as, for example, random access memory (RAM), read only memory (ROM), a fixed memory device (e.g., hard drive), a removable memory device (e.g., diskette), flash memory, etc. In addition, the term "I/O devices" as used herein is intended to include, for instance, one or more input devices (e.g., mouse, keyboard, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in whole or in part (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of connecting a first device to a second device via a wireless communication channel, the method comprising the steps of:

arbitrarily assigning one of a first state and a second state to the first device, wherein in the first state the first device seeks to establish a connection with the second device, and in the second state the first device renders itself available for connection with the second device; and alternating a present state of the first device between the first state and the second state in accordance with a probability distribution until at least one of a predetermined timeout period has expired and a connection with the second device has been established, the length of time that the first device remains in the first and second states being at least partially controlled by the probability distribution.

2. The method of claim 1, further comprising the step of modifying at least one parameter associated with the probability distribution, the at least one parameter affecting an alternating state sequence of the first device, whereby a period of time that the first and second devices are in complimentary states is optimized, thereby minimizing a connection establishment time.

3. The method of claim 1, further comprising the steps of:
initializing an elapsed time counter; and
periodically measuring an elapsed time from the counter to determine whether the predetermined timeout period has been exceeded.

4. The method of claim 3, wherein the step of measuring the elapsed time is performed before each change of state of the first device.

5. The method of claim 1, wherein the probability distribution is a random distribution.

6. The method of claim 1, wherein the first and second devices include Bluetooth-enabled devices.

7. The method of claim 6, wherein the first state is an INQUIRY state and the second state is an INQUIRY SCAN state.

8. A method of establishing a connection between a plurality of devices via at least one wireless communication channel, the method comprising the steps of:

arbitrarily assigning one of a first state and a second state to each of the devices, wherein in the first state a device seeks to discover and establish a connection with another device, and in the second state a device renders itself available for discovery and connection with another device; and alternating a present state of each of the devices between the first state and the second state until at least one of a predetermined timeout period has expired and a connection between the devices has been established, a length of time that each of the devices remains in its present state being at least partially determined by one or more predefined probability distributions.

9. The method of claim 8, wherein each of the devices includes a probability distribution associated therewith for separately controlling the length of time that the device remains in its present state.

10. The method of claim 8, further comprising the steps of:

electing a coordinator, the coordinator being a device selected from the plurality of devices and storing information corresponding to each of the devices;

assigning one of a master role, a slave role, and a bridge role to each of the devices, the roles being assigned by the coordinator in accordance with predefined rules; and connecting the devices together in accordance with the role assignment for each device to form a wireless network.

11. The method of claim 10, wherein the step of electing a coordinator comprises the steps of:

establishing a point-to-point connection between two devices;

determining a winning device and a losing device in accordance with predetermined criteria;

receiving, from the losing device, information relating to the losing device and any devices that the losing device has previously established a connection with; and repeating the coordinator election steps until all devices have been accessed.

12. The method of claim 11, further comprising the step of disabling the losing device from further participating in the coordinator election process after receiving the information relating to the losing device and any devices that the losing device has previously accessed.

13. The method of claim 11, wherein the step of determining the winning device further comprises comparing information corresponding to each of the plurality of devices.

14. Apparatus for connecting a first device to a second device via a wireless communication channel, the apparatus comprising:

at least one processor operative to: (i) arbitrarily assign one of a first state and a second state to the first device, wherein in the first state the first device seeks to establish a connection with the second device, and in the second state the first device renders itself available for connection with the second device; and (ii) alternate a present state of the first device between the first state and the second state in accordance with a probability distribution until at least one of a predetermined timeout period has expired and a connection with the second device has been established, the length of time that the first device remains in the first and second states being at least partially controlled by the probability distribution.

15. The apparatus of claim 14, further comprising at least one input/output (I/O) device operatively coupled to the processor for entering data to the processor, the data modifying at least one parameter associated with the probability distribution for affecting the length of time that the first device remains in the first and second states.

16. The apparatus of claim 15, further comprising a memory operatively coupled to the at least one processor, the memory storing at least one of the probability distribution and the entered data.

17. The apparatus of claim 14, wherein the at least one processor is further operative to: (iii) initialize an elapsed time counter; and (iv) periodically measure an elapsed time from the counter to determine whether the predetermined timeout period has been exceeded.

18. The apparatus of claim 14, wherein the first device includes a Bluetooth-enabled device.

19. Apparatus for establishing a connection between a plurality of devices via at least one wireless communication channel, the apparatus comprising:

at least one processor operative to: (i) arbitrarily assign one of a first state and a second state to each of the devices, wherein in the first state a device seeks to discover and establish a connection with another device, and in the second state the device renders itself available for discovery and connection with another device; and (ii) alternate a present state of each of the devices between the first state and the second state until at least one of a predetermined timeout period has expired and a connection between the devices has been established, a length of time that each of the devices remains in its present state being at least partially determined by one or more predefined probability distributions.

20. The apparatus of claim 19, wherein the processor is further operative to: (iii) elect a coordinator, the coordinator being a device selected from the plurality of devices and storing information corresponding to each of the devices; (iv) assign one of a master role, a slave role, and a bridge role to each of the devices, the roles being assigned by the coordinator in accordance with predefined rules; and (v) connecting the devices together, in accordance with the role assignment for each device, to form a wireless network.

* * * * *